United States Patent
Gamble

(10) Patent No.: US 10,458,393 B2
(45) Date of Patent: Oct. 29, 2019

(54) WIND-POWERED RECHARGING FOR A WEIGHT-SHIFTING COAXIAL HELICOPTER

(71) Applicant: Lockheed Martin Corporation, Bethesda, MD (US)

(72) Inventor: Dustin Eli Gamble, San Luis Obispo, CA (US)

(73) Assignee: Lockheed Martin Corporation, Menlo Park, CA (US)

( * ) Notice: Subject to any disclaimer, the term of this patent is extended or adjusted under 35 U.S.C. 154(b) by 106 days.

(21) Appl. No.: 15/269,229

(22) Filed: Sep. 19, 2016

(65) Prior Publication Data
US 2017/0284371 A1    Oct. 5, 2017

Related U.S. Application Data

(63) Continuation-in-part of application No. 15/085,540, filed on Mar. 30, 2016.

(51) Int. Cl.
*B64C 27/08*    (2006.01)
*F03D 9/32*    (2016.01)
(Continued)

(52) U.S. Cl.
CPC ............... *F03D 9/32* (2016.05); *B64C 27/10* (2013.01); *B64C 27/14* (2013.01); *B64C 27/50* (2013.01);
(Continued)

(58) Field of Classification Search
CPC ......... B64C 17/04; B64C 27/10; B64C 27/52; B64C 39/024; B64C 2201/108
See application file for complete search history.

(56) References Cited

U.S. PATENT DOCUMENTS

| | | |
|---|---|---|
| 3,226,059 A | 12/1965 | Paterson et al. |
| 4,163,535 A | 8/1979 | Austin |

(Continued)

FOREIGN PATENT DOCUMENTS

| | | |
|---|---|---|
| CH | 695790 | 8/2006 |
| CN | 203512040 U | 4/2014 |

(Continued)

OTHER PUBLICATIONS

European Extended Search Report in Application No. 17190769.4-1010, dated Jan. 23, 2018, 8 pages.
(Continued)

*Primary Examiner* — Richard G Davis
(74) *Attorney, Agent, or Firm* — Baker Botts L.L.P.

(57) ABSTRACT

A helicopter includes a propulsion system, gimbal assembly, and a controller. The propulsion system includes a first and second rotor assembly, wherein the first rotor assembly comprises a first motor coupled to a first rotor, the first rotor comprising a plurality of first fixed-pitch blades and the second rotor assembly comprises a second motor coupled to a second rotor, the second rotor comprising a plurality of second fixed-pitch blades. The second rotor is coaxial to the first rotor and is configured to be counter-rotating to the first rotor. The controller is communicably coupled to the gimbal assembly and is configured to provide instructions to at least one of the first or second gimbal motors in order to orient the plurality of first and second fixed-pitch blades into a position that permits wind to rotate the first and second fixed-pitch blades and thereby charge the power source.

20 Claims, 11 Drawing Sheets

(51) Int. Cl.
   *B64C 27/10*  (2006.01)
   *B64C 27/14*  (2006.01)
   *B64C 27/80*  (2006.01)
   *B64C 27/50*  (2006.01)
   *F03D 17/00*  (2016.01)
   *B64C 27/52*  (2006.01)

(52) U.S. Cl.
   CPC .............. *B64C 27/52* (2013.01); *B64C 27/80* (2013.01); *F03D 17/00* (2016.05); *B64C 2201/024* (2013.01); *B64C 2201/127* (2013.01); *F05B 2220/90* (2013.01); *F05B 2240/923* (2013.01)

(56) References Cited

U.S. PATENT DOCUMENTS

| | | | |
|---|---|---|---|
| 5,996,933 | A | 12/1999 | Schier |
| 6,347,764 | B1 | 2/2002 | Brandon et al. |
| 7,653,464 | B1 | 1/2010 | Mitra |
| 7,789,341 | B2 | 9/2010 | Arlton et al. |
| 8,083,173 | B2 | 12/2011 | Arlton et al. |
| 8,109,711 | B2 | 2/2012 | Blumer et al. |
| 8,146,854 | B2 | 4/2012 | Lawrence |
| 8,167,234 | B1 * | 5/2012 | Moore ............... B64C 37/00 244/17.23 |
| 8,348,193 | B2 | 1/2013 | McGeer et al. |
| 8,387,911 | B2 | 3/2013 | Collette |
| 8,418,959 | B2 | 4/2013 | Kang et al. |
| 8,469,307 | B2 | 6/2013 | Arlton et al. |
| 8,590,829 | B2 | 11/2013 | Keidar et al. |
| 8,602,349 | B2 | 12/2013 | Petrov |
| 8,720,816 | B2 | 5/2014 | Salkeld |
| 9,284,058 | B2 | 3/2016 | Wang |
| 9,321,529 | B1 * | 4/2016 | Jones ............... B64C 39/02 |
| 9,550,577 | B1 * | 1/2017 | Beckman ............ B64C 39/024 |
| 2004/0200924 | A1 | 10/2004 | Clark, Jr. et al. |
| 2005/0051667 | A1 * | 3/2005 | Arlton ............... B64C 27/10 244/17.11 |
| 2007/0012818 | A1 * | 1/2007 | Miyazawa ........... A63H 27/12 244/17.25 |
| 2009/0212157 | A1 | 8/2009 | Arlton et al. |
| 2011/0186687 | A1 | 8/2011 | Elder |
| 2011/0290937 | A1 * | 12/2011 | Salkeld ............... B64C 17/04 244/80 |
| 2012/0153087 | A1 | 6/2012 | Collette et al. |
| 2012/0298790 | A1 * | 11/2012 | Bitar ............... B64C 27/12 244/17.11 |
| 2015/0184637 | A1 | 7/2015 | Vander Lind et al. |

FOREIGN PATENT DOCUMENTS

| | | |
|---|---|---|
| EP | 2610 173 | 7/2013 |
| GB | 2514340 A | 11/2014 |
| WO | WO 2014/025444 | 2/2014 |
| WO | WO 2014/165502 | 10/2014 |

OTHER PUBLICATIONS

Communication Pursuant to Article 94(3) EPC in EP Application No. 17 163 329.0-1010, dated Jan. 8, 2019, 4 pages.
Communication Pursuant to Article 94(3) EPC in EP Application No. 17 190 769.4-1010, dated Jan. 8, 2019, 4 pages.

* cited by examiner

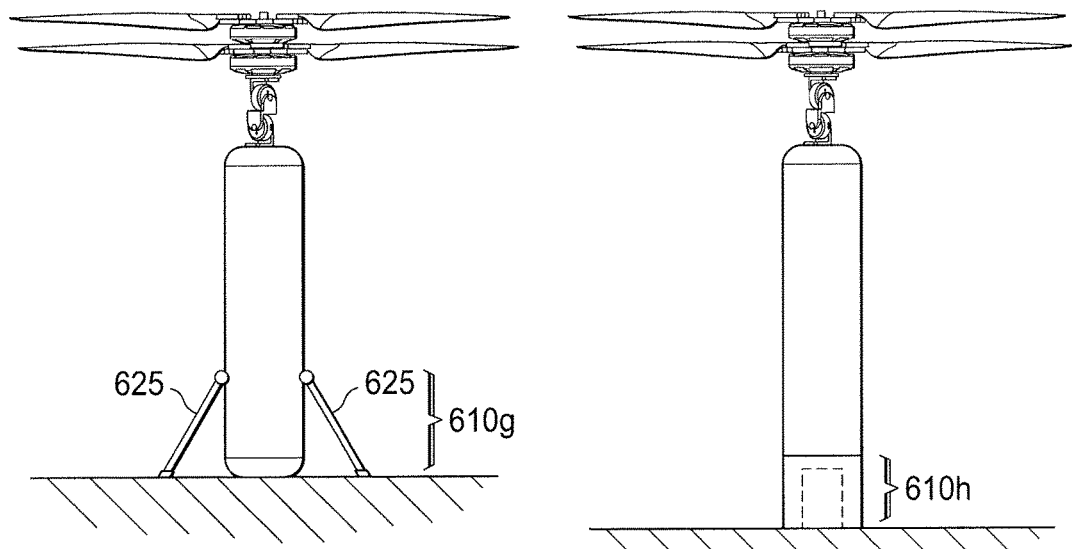
FIG. 6G
FIG. 6H
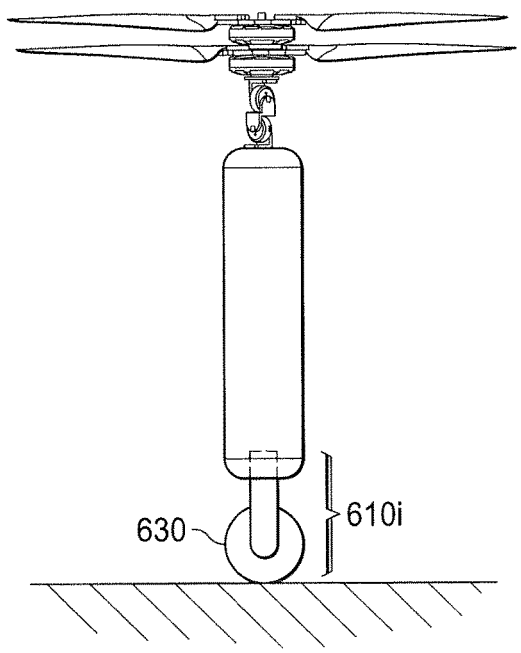
FIG. 6I

WIND-POWERED RECHARGING FOR A WEIGHT-SHIFTING COAXIAL HELICOPTER

RELATED APPLICATION

This application is a continuation-in-part of pending U.S. patent application Ser. No. 15/085,540 entitled "Weight-Shifting Coaxial Helicopter", which was filed on Mar. 30, 2016.

TECHNICAL FIELD

This disclosure relates in general to helicopters and more particularly to wind-powered recharging for a weight-shifting coaxial helicopter.

BACKGROUND

Unmanned helicopters are powered aircraft that do not require an onboard operator. Instead, unmanned helicopters may fly autonomously or may be piloted remotely. Unmanned helicopters are designed in various forms and sizes and may be used for an array of applications. For example, military organizations and law enforcement may utilize unmanned helicopters in activities such as policing and surveillance. As another example, civilian businesses may use unmanned helicopters for applications such as aerial photography or to deliver parcels. Typically, unmanned helicopters are in the shape of traditional single rotor helicopters or multirotor helicopters (e.g., quadcopters and the like).

SUMMARY OF THE DISCLOSURE

According to one embodiment, a helicopter includes a propulsion system, gimbal assembly, and a controller. The propulsion system includes a first and second rotor assembly, wherein the first rotor assembly comprises a first motor coupled to a first rotor, the first rotor comprising a plurality of first fixed-pitch blades. The second rotor assembly comprises a second motor coupled to a second rotor, the second rotor comprising a plurality of second fixed-pitch blades. The second rotor is coaxial to the first rotor and is configured to be counter-rotating to the first rotor. The controller is communicably coupled to the gimbal assembly and is configured to provide instructions to at least one of the first or second gimbal motors in order to orient the plurality of first and second fixed-pitch blades into a position that permits wind to rotate the first and second fixed-pitch blades and thereby charge the power source.

Technical advantages of certain embodiments may include providing a helicopter having long endurance and quiet operation. Additionally, certain embodiments may provide advantages such as increased reliability and reduced cost due to relatively few moving parts. Furthermore, certain embodiments are configured to be highly transportable and easily deployable or launchable by other aircraft. Certain embodiments may also be self-sustaining such that they are configured to generate their own power. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIGS. 6A-I illustrate example landing modules of the weight-shifting coaxial helicopter of FIG. 1, according to certain embodiments;

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5, where like numbers are used to indicate like and corresponding parts.

The multirotor helicopter design has become a popular configuration for current unmanned helicopters. In order to fly, a helicopter produces an amount of lift that is greater than the force of gravity acting upon it. The spinning of a helicopter's rotor blades results in lift. Lift may be generated either by changing the speed of its rotors, or by changing the pitch angle of its rotor blades. Helicopters that generate lift by changing the speed of their rotors employ "fixed-pitch control." Helicopters that generate lift by changing the pitch angle of their rotor blades employ "collective-pitch control."

Helicopters with fixed-pitch control have main rotor blades that are held at a fixed angle. Because of this, any change in altitude of a fixed-pitch helicopter is controlled by its motor speed. Thus, when a fixed-pitch helicopter increases the speed of its motor, the rotor blades rotate faster and more lift is generated. The opposite is also true: decreasing the speed of the helicopter's motor results in a decrease of the rotation of its rotor blades and thus a decrease in lift.

Helicopters with fixed-pitch control may provide advantages such as reduced complexity and improved reliability.

Helicopters with collective-pitch control have rotatable rotor blades capable of collectively changing their pitch angle. Because collective-pitch helicopters may achieve lift by controlling a combination of rotor speed and pitch angles, they enjoy the advantage of longer endurance. Such helicopters also have increased maneuverability and responsivity because collectively varying the pitch angle of the rotor blades allows for better control over the lift of the helicopter.

Many typical helicopters are commonly associated with disadvantages such as loud operation, increased cost, and reduced reliability due to mechanical complexity. Accordingly, there is a need for a helicopter configuration which has quiet operation and increased reliability, provided by fixed-pitch helicopter, while still being maneuverable and responsive and having longer endurance like collective-pitch control helicopter.

The teachings of the disclosure recognize that using weight-shifting to control the movement of a helicopter during flight may provide one or more of the above advantages. The following describes embodiments of weight-shifting coaxial helicopters that provide these and other desired features.

Figure 1:
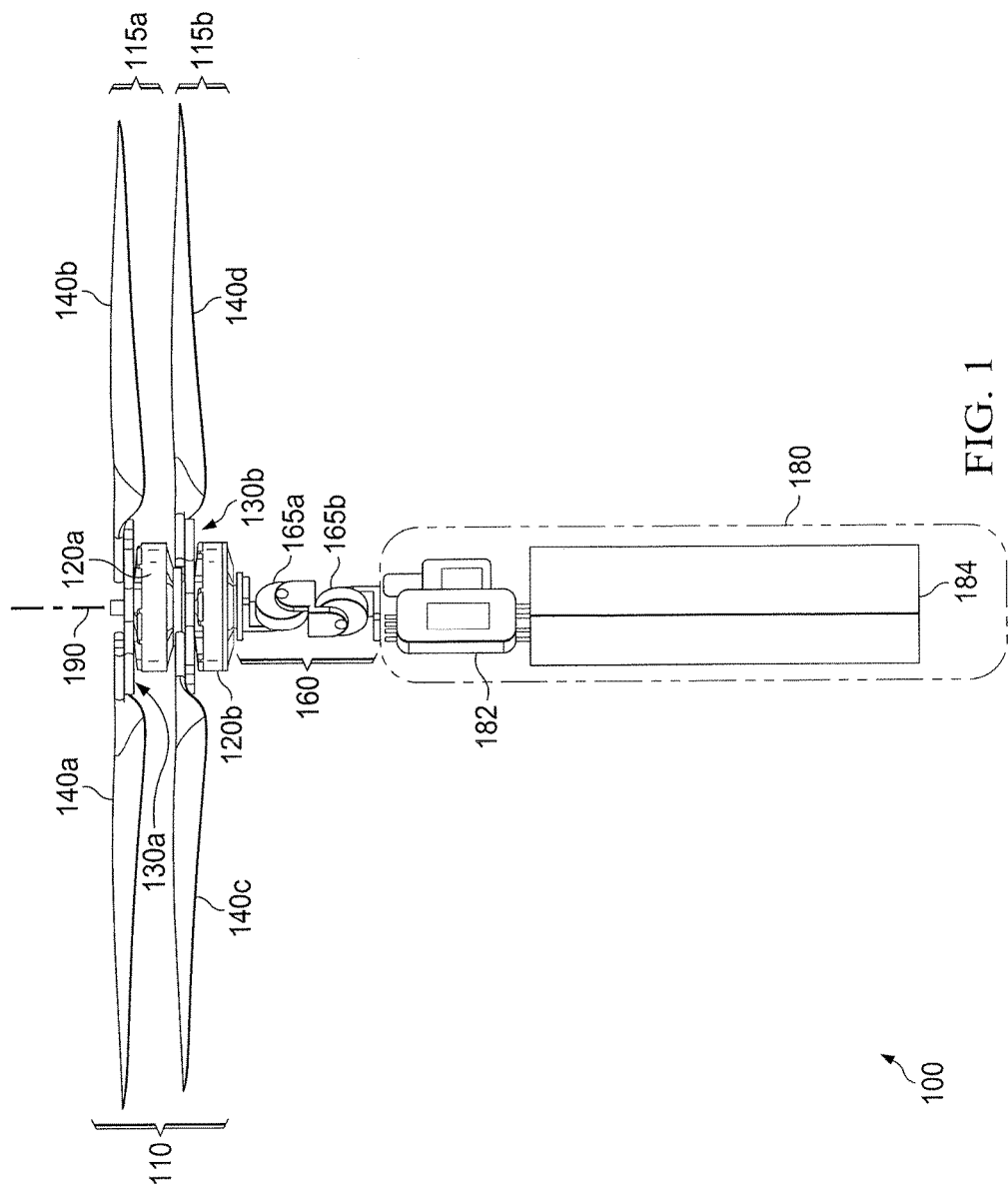
FIG. 1 illustrates a weight-shifting coaxial helicopter, according to certain embodiments.

FIG. 1 illustrates a weight-shifting coaxial helicopter 100, according to certain embodiments. Helicopter 100 includes a propulsion system 110, a gimbal assembly 160, and a fuselage 180. In general, helicopter 100 utilizes weight-shifting of fuselage 180 to control its movements during flight.

Helicopter 100 includes multiple components with a single one of some of components being represented in FIGS. 1-6. One skilled in the art will understand that more than the depicted number of components can be included as performance and mission demands dictate. One skilled in the art will also understand that helicopter 100 can include other components that are not illustrated but typically included with helicopters.

Figure 2:
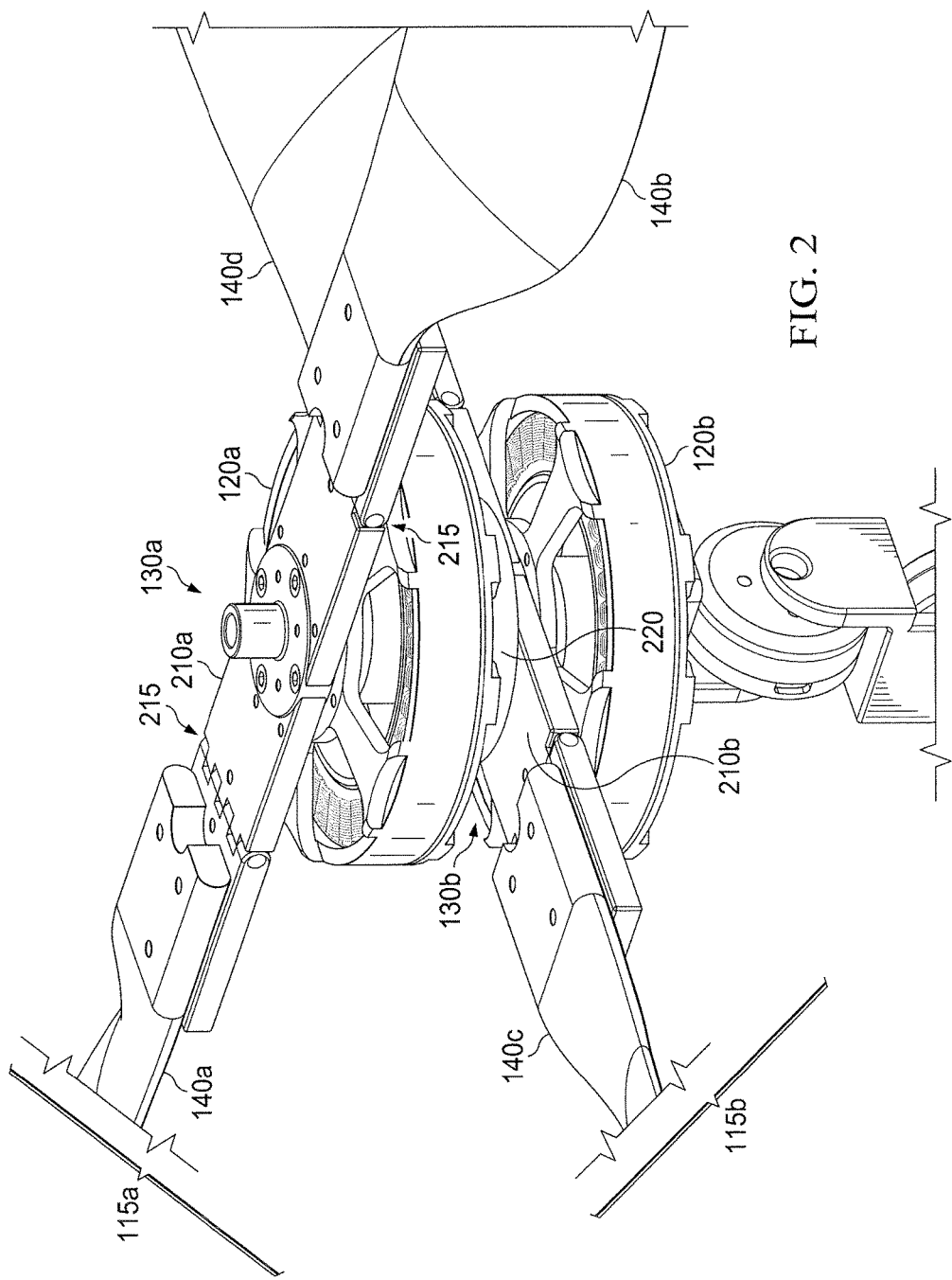
FIG. 2 illustrates an example propulsion system of the weight-shifting coaxial helicopter of FIG. 1, according to certain embodiments.

In some embodiments, propulsion system 110 includes a first rotor assembly 115a and a second rotor assembly 115b. Each rotor assembly 115 may include a motor 120 (e.g., 120a, 120b) coupled to a rotor 130 (e.g., 130a, 130b). Each rotor 130 may include a plurality of blades 140 (e.g., 140a-d). In some embodiments, rotors 130 are coaxial and counter-rotating. That is, rotor 130a and rotor 130b share the same axis 190 of rotation, however rotor 130a rotates in one direction while rotor 130b rotates in the opposite direction. Counter-rotation of rotors 130a-b may be accomplished using a fixed shaft 220 as depicted in FIG. 2. The rotation of rotors 130 result in the driving of blades 140 in the direction of their respective rotors. In some embodiments, motors 120 are high torque outrunner brushless electric motors and are suitable for providing power to rotate rotors.

The configuration of propulsion system 110 may vary. For example, in some embodiments, such as that depicted in FIG. 1, propulsion system 110 is configured such that all components of first rotor assembly 115a are stacked atop all components of second rotor assembly 115b. In other embodiments, such as that depicted in FIG. 5, the components (e.g., motor 120, rotor 130, blades 140) of each rotor assembly 115 are arranged in a different configuration. Although this disclosure illustrates and describes propulsion system 110 having specific configurations, this disclosure contemplates propulsion system 110 having any suitable configuration.

In some embodiments, such as the illustrated embodiment of FIG. 1, rotor 130a comprises two blades 140 (i.e., blades 140a-b), and rotor 130b comprises two blades 140 (i.e., blades 140c-d). In other embodiments, the number of blades 140 of rotor 130a may be different than the number of blades 140 of rotor 130b. For example, rotor 130a may include four blades 140, and rotor 130b may include three blades 140. This disclosure anticipates any appropriate number of blades 140 for rotors 130.

In some embodiments, blades 140 have pitch angles that are fixed (i.e., the pitches of blades 140 are not adjustable). In some embodiments, the pitch angles of blades 140 of rotor 130a may differ from the pitch angles of blades 140 of rotor 130b, or all blades 140 may have the same pitch angle. This disclosure anticipates any appropriate pitch angle of blades 140.

In some embodiments, all blades 140 may be the same length. In other embodiments, the lengths of blades 140 of rotor 130a may be different from the lengths of blades 140 of rotor 130b. In certain embodiments, blades 140 have lengths equal to or substantially equal to (e.g., within +/−100 of) the overall length of helicopter 100. By having lengths equal to or substantially equal to the overall length of helicopter 100, helicopter 100 is provided with high packaging efficiency. This disclosure recognizes that increased blade length is associated with certain advantages such as increased efficiency and quiet operation.

Figure 3:
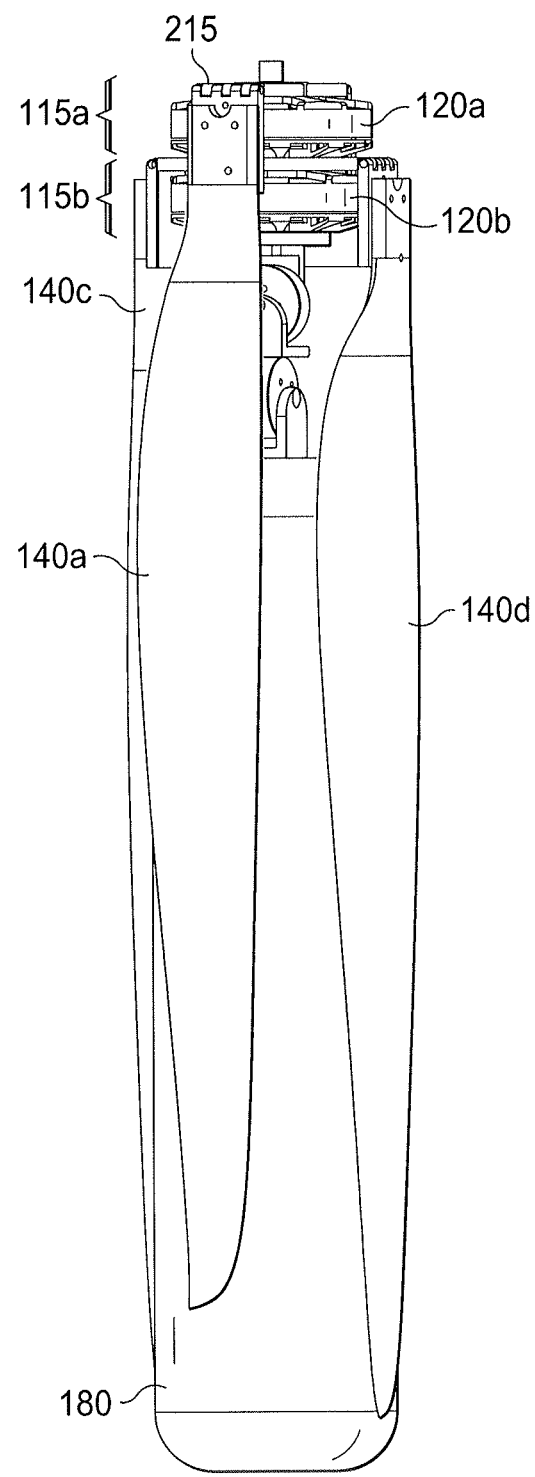
FIG. 3 illustrates a folding capability of the weight-shifting coaxial helicopter of FIG. 1.

In some embodiments, helicopter 100 may include a folding capability in order to be more compact and easily moveable. For example, FIG. 3 illustrates helicopter 100 with blades 140 folded alongside fuselage 180 to increase packaging efficiency. In particular, blades 140 may pivot from a position perpendicular to fuselage 180 used during flight to a position parallel to fuselage 180 for storage. This may allow, for example, helicopter 100 to be placed inside a tube or other elongated structure. As a specific example, blades 140 may be folded parallel to fuselage 180 to allow helicopter 100 to be stored inside a tubular structure mounted to another aircraft. Helicopter 100 may then be launched or otherwise released from the other aircraft while in flight, at which point blades 140 may pivot back to being perpendicular to fuselage 180 to allow proper flight operations of helicopter 100. FIG. 2, described in more detail below, illustrates a particular embodiment that utilizes hinge mechanisms 215 to allow blades 140 to pivot as described above.

Gimbal assembly 160 is mechanically coupled to both propulsion system 110 and fuselage 180 of helicopter 100. In some embodiments, gimbal assembly 160 includes two gimbal motors 165 (i.e., 165a and 165b) which are controlled by a controller (e.g., controller 182 discussed below) in order to weight-shift fuselage 180 and thereby control the movements of helicopter 100. In the illustrated embodiment, one gimbal motor 165 (e.g. 165a) is configured to control the pitch of helicopter 100 and the other gimbal motor 165 (e.g., 165b) is configured to control the roll of helicopter 100. In some embodiments, gimbal motors 165a and 165b are arranged in a stacked assembly as illustrated in FIGS. 1-6 and are positioned along different axes 420 that are perpendicular to one another. In some embodiments, housing 410 secures gimbal motor 165a along one axis and secures gimbal motor 165b along a different axis. Some embodiments of gimbal assembly 160 are discussed in more detail below in reference to FIGS. 4 and 5.

Fuselage 180 of helicopter 100 is mechanically coupled to gimbal assembly 160. In some embodiments, fuselage 180 may include a power source 184 and a controller 182. Fuselage 180 may have any appropriate shape or dimensions. In the illustrated embodiment, fuselage 180 is tubular in shape, which may permit helicopter 100 to be stored within a tube or other elongated structure as described above. In some embodiments, fuselage 180 is a single tubular body. In other embodiments, fuselage 180 is a tubular body formed from a plurality of separable, modular components arranged in a stacked assembly. Such modular components may include a payload module and/or a landing module. By way of example, a payload module may include a camera system, a GPS system, or any other avionics system. Examples of various landing modules are discussed further below in reference to FIG. 6A-I.

Although not illustrated, helicopter 100 may also include a wing. In some embodiments, the wing may be coupled to an exterior portion of fuselage 180. The wing may be configured to increase the speed of helicopter 100 or increase the flight duration of helicopter 100.

As described above, fuselage 180 is weight-shifted in order to control the movements of helicopter 100. To do so, some embodiments include controller 182 that is communicably coupled to gimbal motors 165. Controller 182 is configured to provide instructions to gimbal motors 165 via any appropriate communications link (e.g., wired or wireless). In some embodiments, controller 182 is also communicably coupled to motors 120 and is configured to dynamically control throttle to motors 120. As described in more detail below, controlling throttle to motors 120 assists in flight control of helicopter 100. In some embodiments, controller 182 includes (or is communicatively coupled to) one or more gyroscopes and/or one or more accelerometers. In some embodiments, controller 182 includes or is a computer system such as computer system 700 described below in reference to FIG. 7.

Power source 184 is any appropriate source of power for helicopter 100 and is electrically coupled to controller 182, gimbal motors 165, and motors 120. In some embodiments, power source 184 is a primary or secondary cell battery. In other embodiments, power source 184 may be a generator such as a compact gas engine or fuel cell. Although this disclosure specifies and describes particular forms of power source 184, this disclosure contemplates any suitable power source 184 of helicopter 100. It will be understood by a person of ordinary skill in the art that power source 184 supplies power to some or all electronic components of helicopter 100 for proper operation of helicopter 100.

FIG. 2 illustrates an example embodiment of propulsion system 110 of helicopter 100. As described above, propulsion system 110 may include rotor assemblies 115. In some embodiments, rotor assemblies 115 include motors 120 coupled to rotors 130 which include blades 140. In other embodiments, rotor assemblies 115 may include additional or fewer components.

In some embodiments, blades 140 are coupled to motor 120 via a hub 210. For example, each hub 210 may be coupled to a rotating shaft of motor 120, and blades 140 in turn are coupled to hub 210. In some embodiments, hub 210 may include one or more hinge mechanisms 215, as described in more detail below.

As described above, helicopter 100 may be configured to have a folding capability. As illustrated in FIGS. 2-3, blades 140a-b may be coupled to hub 210a of rotor 130a via hinge mechanisms 215. Hinge mechanisms 215 are configured to allow blades 140 to pivot from a position perpendicular to fuselage 180 (as illustrated in FIG. 2) to a position parallel to fuselage 180 (as illustrated in FIG. 3). That is, a force applied to blades 140 in the upwards direction may result in a distal folding of blades 140 in relation to fuselage 180. Alternatively, a force applied to blades 140 in the downwards direction will result in a proximal folding of blades 140 in relation to fuselage 180. Such folding of the blades 140 is illustrated in FIG. 3. In some embodiments, centrifugal force may be used to pivot blades 140. For example, the rotation of rotor 130 by motor 120 may exert centrifugal forces upon blades 140 and cause them to pivot from a folded position into a position perpendicular to fuselage 180.

In some embodiments, the lack of rotation of rotor 130 may cause blades 140 to automatically pivot back into a folded position. In some embodiments, the pivoting of blades 140 to a position perpendicular to fuselage 180 powers on helicopter 100.

In some embodiments, helicopter 100 may be deployed from another aircraft (a "drop aircraft") when blades 140 of helicopter 100 are positioned perpendicular to fuselage 180. This compact configuration of helicopter 100 may provide certain advantages in regards to removably coupling helicopter 100 to the drop aircraft and in regards to the deployment of helicopter 100 from the drop aircraft. For example, a helicopter 100 in the compact configuration of FIG. 3 may be placed a spring-loaded deployment tube mounted to the drop aircraft. At an appropriate time, helicopter 100 may be discharged from the drop aircraft causing blades 140 to pivot into a position perpendicular to fuselage 180. This disclosure contemplates that pivoting of blades 140 into a position perpendicular to fuselage 180 may be weight-driven, servo driven, spring-driven, and the like. In some embodiments, blades 140 will lock in the perpendicular position once they have pivoted into the position perpendicular to fuselage 180. In other embodiments, blades 140 will pivot into the perpendicular position sequentially. In some embodiments, the pivoting of blades 140 into the perpendicular position results in the activation of some or all electronic components, including gimbal motors 165 and motors 120. For example, upon detection that blades 140 have pivoted into a position perpendicular to fuselage 180, controller 182 may provide instructions to motors 120 and gimbal motors 165. As a result, helicopter 100 is able to stay aloft and control its movements during flight.

In some embodiments, a fixed shaft 220 is used to couple first rotor assembly 115a to helicopter 100. Fixed shaft 220 may be any non-rotating member used to couple first rotor assembly 115a to gimbal assembly 160. In some embodiments, a portion of fixed shaft 220 passes through second rotor assembly 115b. For example, fixed shaft 220 may include a shaft portion that passes through an aperture down the center of motor 120b. This allows the counter-rotation of rotors 130a and 130b. Although this disclosure depicts and illustrates a fixed shaft 220 to accomplish counter-rotation of rotors 130, this disclosure contemplates any suitable component or configuration of helicopter 100 resulting in counter-rotation of rotors 130.

Figure 4:
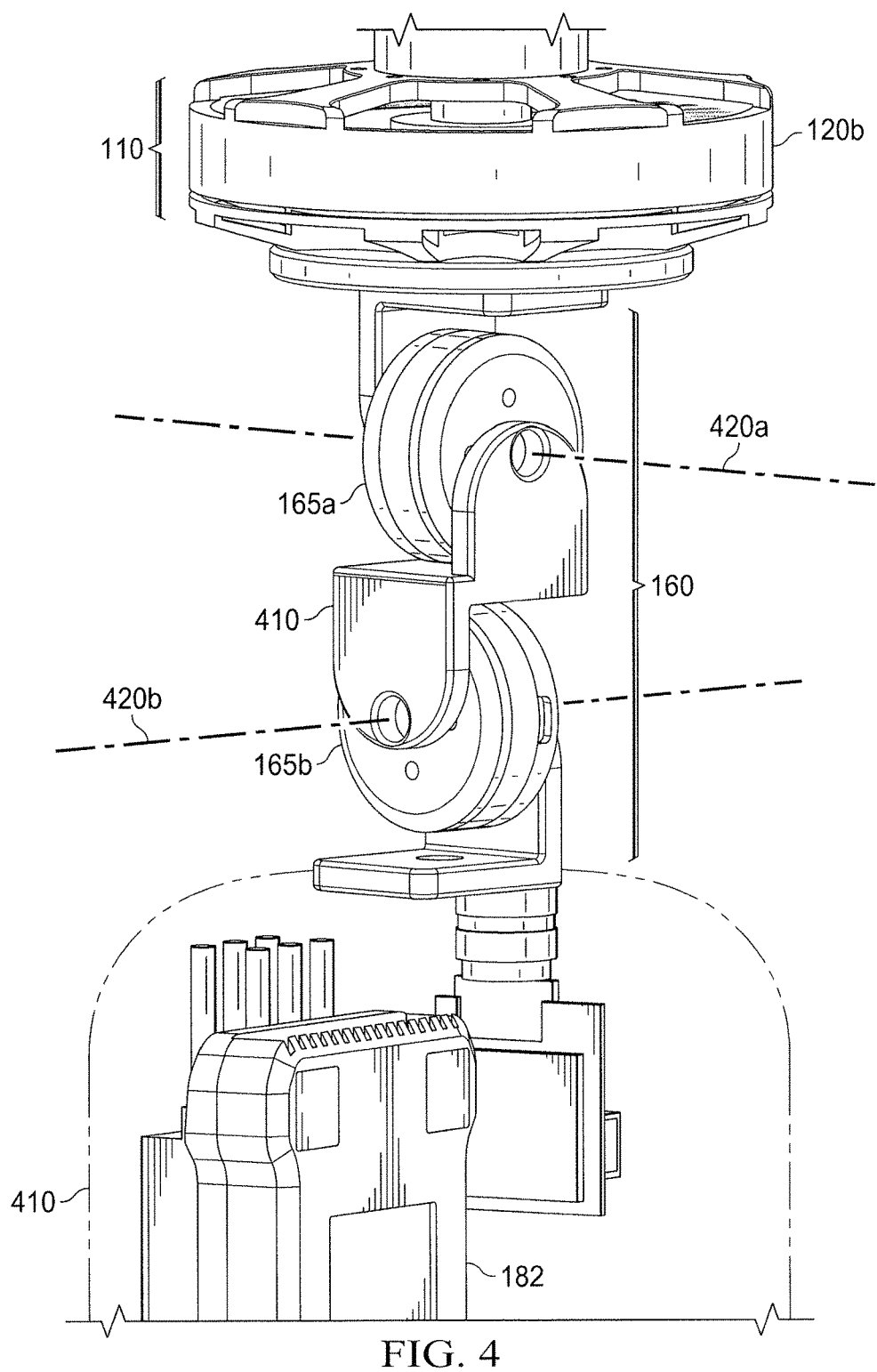
FIG. 4 illustrates an example gimbal assembly of the weight-shifting coaxial helicopter of FIG. 1, according to certain embodiments.
Figure 5:
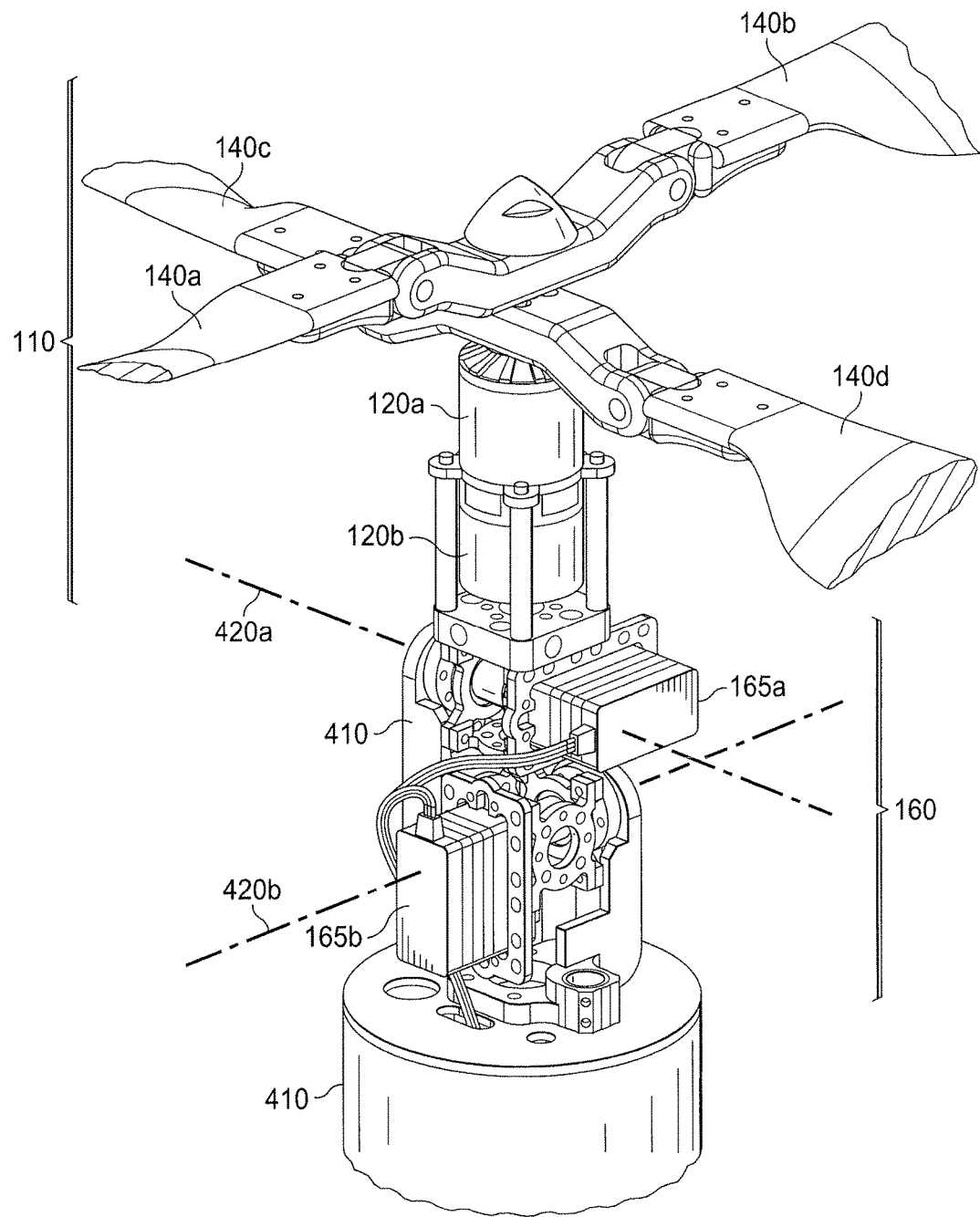
FIG. 5 illustrates an example gimbal assembly of another embodiment of a weight-shifting coaxial helicopter, according to certain embodiments.

FIG. 4 illustrates an example gimbal assembly 160 of weight-shifting coaxial vehicle 100 of FIG. 1. As described above, gimbal assembly 160 may couple propulsion system 110 to fuselage 180. Gimbal assembly 160 may include one or more gimbal motors 165 (e.g., 165a-b) and a housing 410. In some embodiments, gimbal motors 165 may be direct torque motors such as those depicted in FIG. 4. In other embodiments, gimbal motors 165 may be servo motors such as those as depicted in FIG. 5. In yet other embodiments, gimbal motor 165 may include one or more linear actuators. Although this disclosure illustrates and describes specific types of gimbal motors 165, this disclosure contemplates using any suitable gimbal motor 165 that creates torque and shifts the weight of fuselage 180.

In some embodiments, housing 410 secures gimbal motors 165 along different axes, such as axes 420a and 420b. In some embodiments, axes 420a and 420b may be perpendicular to each other and axis 190. In some embodiments, housing 410 may provide structural support for motors 130. Housing 410 may have any appropriate shape or dimensions, and may be formed of any appropriate material.

In general, housing 410 separates gimbal motor 165*a* from gimbal motor 165*b* and secures them along two different axes 420*a* and 420*b*. A two-axis gimbal assembly 160, such as those depicted in FIGS. 4-5, may provide helicopter 100 with pitch and roll control during flight. Specifically, a first gimbal motor 165 (e.g., 165*a*) may be secured by housing 410 along first axis 420*a* providing helicopter 100 with pitch control, and a second gimbal motor 165 (e.g., 165*b*) may be secured by housing 410 along second axis 420*b* providing helicopter 100 with roll control. In one embodiment, gimbal assembly 160 is configured such that the gimbal motor 165 associated with pitch control is located above the gimbal motor 165 associated with roll control. In another embodiment, gimbal assembly 160 is configured such that the gimbal motor 165 associated with roll control is located above the gimbal motor 165 associated with pitch control.

In operation, power source 184 provides power to some or all electronic components of helicopter 100 including controller 182, gimbal motors 165, and motors 120. As a result, rotors 130 spin in counter-rotating directions about axis 190, thereby creating thrust and generating lift of helicopter 100. The altitude of helicopter 100 may be changed by symmetrically varying throttle to motors 120. To control the yaw of helicopter 100, throttle to motors 120 is asymmetrically varied. For example, to yaw to the left, motor 120*a* may increase throttle while motor 120*b* decreases throttle. Such increased throttle of motor 120*a* results in increased torque on helicopter 100. Without similar torque being created by motor 120*b*, helicopter 100 will yaw to the left. Using asymmetric or differential throttle may permit yaw control without reducing lift.

Once aloft, it may be desirable to change the pitch or roll of helicopter 100. To do so, controller 182 sends one or more instructions to one or more gimbal motors 165. In accordance with the one or more instructions, gimbal motors 165 shift the weight of fuselage 180, thereby producing thrust vectors in the direction of the desired heading. For example, upon receiving one or more instructions regarding pitch from controller 182, gimbal motor 165*a* may weight-shift fuselage 180 in the aft direction. The effect of shifting fuselage 180 in the aft direction is that helicopter will begin flying in the forward direction. As another example, upon receiving one or more instructions regarding roll from controller 182, gimbal motor 165*b* may weight-shift fuselage 180 towards the left. The effect of shifting fuselage 180 towards the left is that helicopter 100 will begin flying in the rightward direction. Thus, as a result of weight-shifting fuselage 180, the movements of helicopter 100 are able to be controlled. This is in contrast to typical helicopters such as helicopters that utilize adjustable-pitch blades and additional tail rotors to control movements. Such vehicles are more complex, more expensive, and are more difficult to repair due to the amount of moving parts required for proper flight. By utilizing weight-shifting, helicopter 100, on the other hand, is less complex, less expensive, and is easier to repair because of its fewer moving parts.

After being aloft for a period of time, it may be advantageous to land helicopter 100. This may be because helicopter 100 has reached its landing destination, has depleted its power source, or any other reason. As described above, fuselage 180 may include one or more landing modules 610A-I (example embodiments are discussed further below in regard to FIGS. 6A-AI). Landing modules 610A-I are configured to support helicopter 100 in a generally vertical orientation along a landing surface. In some embodiments, helicopter 100 is manually retrieved after landing. In other embodiments, helicopter 100 may continue on for a subsequent flight.

In certain embodiments, helicopter 100 is configured to charge power source 184. In such embodiments, helicopter 100 may use onboard components to recharge power source 184. Regeneration may be accomplished by wrapping fuselage 180 in solar panels, by using blades 140*a-d* as wind turbines or any other suitable method. Once power source 184 is sufficiently charged, helicopter 100 may proceed in a subsequent flight.

In some embodiments, retrieval or recovery of helicopter 100 may occur during flight. As an example, another aircraft may release a recovery line while helicopter 100 is aloft. Helicopter 100 may then fly towards and into the recovery line which causes its blades 140*a-d* to get bound in the line. When helicopter 100 is sufficiently secured by the line, the other aircraft may reel in helicopter 100.

FIGS. 6A-I illustrate example landing modules 610 of weight-shifting coaxial helicopter 100 of FIG. 1. As described above, fuselage 180 may be formed from a plurality of separable, modular components which may include landing module 610. As illustrated, FIGS. 6A-I depict various landing modules 610. In some embodiments, landing module 610 is coupled to another modular fuselage component such as a main body component that houses controller 182 and power source 184. Coupling of modular components may be accomplished in a variety of ways including but not limited to, snapping, screwing, locking, fastening, adhering, or using magnets. Landing modules 610 may be configured to support helicopter 100 in a generally vertical orientation.

Figure 6A:
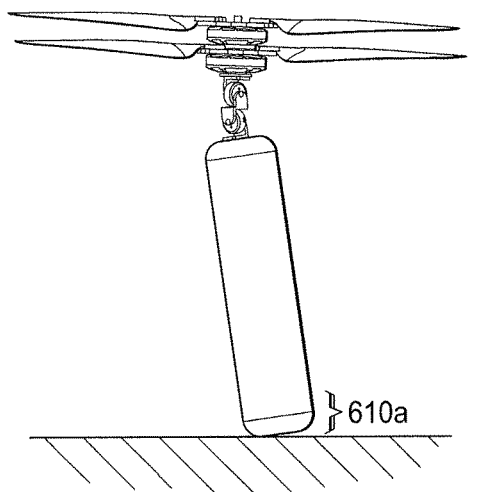

FIG. 6A illustrates an embodiment of a self-balancing landing module 610A. In some embodiments, self-balancing landing module 610A may include an elastic polymeric base. In some embodiments, the elastic polymeric base allows helicopter 100 to land on a surface, absorb shock from landing, and wobble or teeter into an upright position.

Figure 6B:
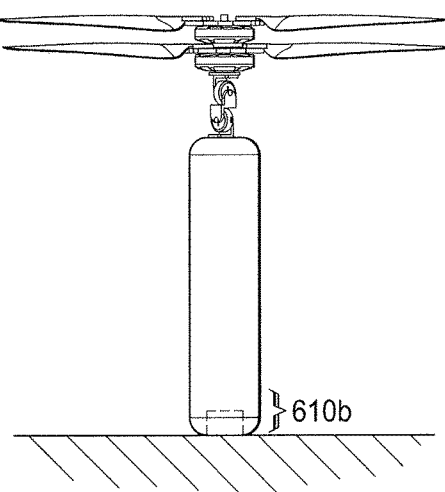

FIG. 6B illustrates an embodiment of a magnetic base landing module 610B. Magnetic base landing module 610B may include any material that either produces a magnetic field or is attracted to a magnetic field. Thus, when helicopter 100 includes a magnetic base landing module 610B, it may couple to any surface having or producing an opposite magnetic field. In some embodiments, magnetic base landing module 610B is electromagnetic. In such embodiments, controller 182 may be communicably coupled to, and configured to provide instructions to, magnetic base landing module 610B. For example, helicopter 100 may include a magnetic base landing module 610B comprising an electromagnet. During flight, controller 182 may disable magnetic base landing module 610B (so that module 610B is not attracted to, or producing, an electromagnetic field) to conserve power. Upon detection of an electromagnetic field or any other appropriate trigger, controller 182 may activate magnetic base landing module 610B for landing. As such, when helicopter 100 nears a surface with an electromagnetic field, the magnetic base landing module 610 of helicopter 100 is attracted to, and couples with, the surface.

Figure 6C:
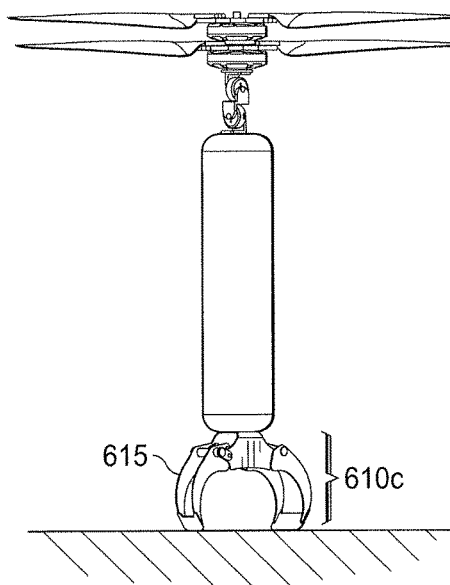

FIG. 6C illustrates one embodiment of a grapple base landing module 610C. Grapple base landing module 610C may comprise a clasp 615 configured to enclose around a cable (e.g., telephone cable, wire fence, clothes line, etc.). As such, clasp 615 may have an open position and a closed position. In some embodiments, controller 182 is communicably coupled to grapple base landing module 610C and configured to control the opening and closing movement of clasp 615. For example, a helicopter 100 that includes grapple base landing module 610C may be ejected from a drop aircraft with clasp 615 in the open position. Upon detection of a cable, helicopter 100 may approach the cable and clasp 615 encloses around the cable upon instruction from controller 182. As a result, helicopter 100 may hang in suspension from the cable in a generally vertical orientation.

Figures 6D, 6E:
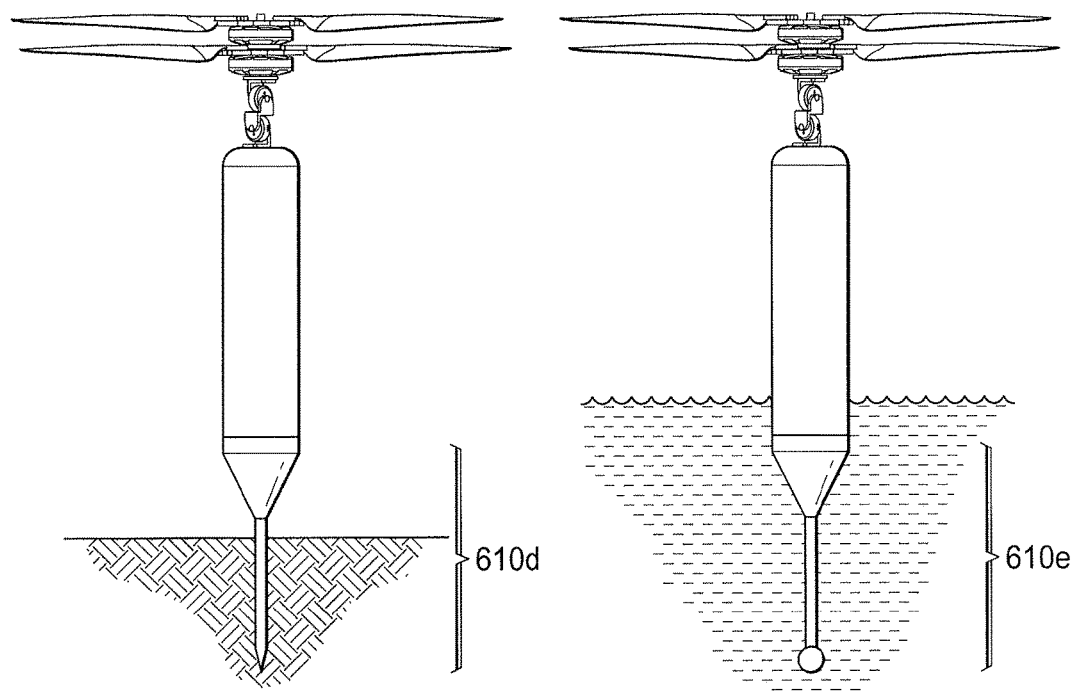

FIG. 6D illustrates one embodiment of a spike base landing module 610D. Spike base landing module 610D may comprise an elongated piece of material terminating in a point and be configured to pierce through a landing surface. For example, a helicopter 100 equipped with spike base landing module 610D may detect and determine that it is nearing a penetrable surface. In preparation, helicopter 100 orients itself so that the point of the spike base landing module 610D pierces through the surface upon landing. As a result, helicopter 100 is planted upright on the surface in a generally vertical orientation.

FIG. 6E illustrates one embodiment of a float base landing module 610E. Float base landing module 610E may be configured to have buoyant properties which allows helicopter 100 to float upon contact with liquid. In some embodiments, float base landing module 610E is configured to allow helicopter 100 to float atop the surface of the liquid. In other embodiments, float base landing module 610E is configured to allow helicopter 100 to float while being partially submerged in the liquid. For example, a helicopter 100 equipped with float base landing module 610E may detect and determine that it is nearing a liquid surface. In preparation, helicopter 100 orients itself such that the buoyant float base landing module 610E comes in contact with the liquid surface. Float base landing module 610E allows helicopter 100 to float upon, or be partially submerged in, the liquid in a generally vertical orientation. In some embodiments, float base landing module 610E is designed to drift away from its initial surface contact point. In some embodiments, float base landing module 610E includes an anchoring component which prevents helicopter 100 from drifting away from its initial surface contact point.

Figure 6F:
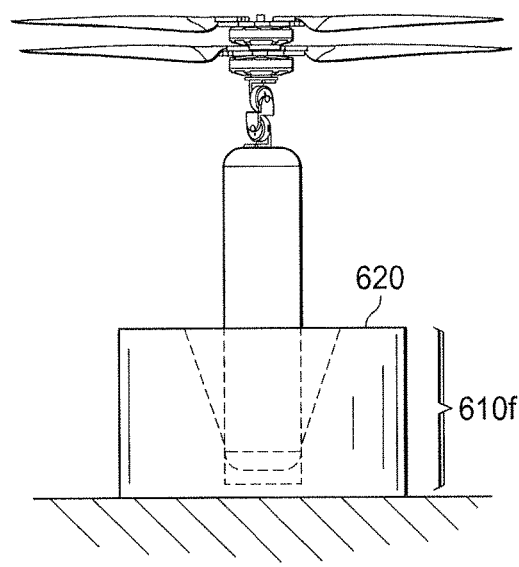

FIG. 6F illustrates one embodiment of a cup holder landing module 610F. Cup holder landing module 610F may be configured to couple with a landing container 620. Landing container 620 may be configured to receive a helicopter 100 having a cup holder landing module 610F. In some embodiments, landing container 620 may have a funnel shape. In other embodiments, landing container 620 may have a different shape. By way of example, helicopter 100 equipped with cup holder landing module 610F detects and determines that it is nearing landing container 620. In preparation, helicopter 100 orients itself in a generally upright, vertical position so that cup holder landing module 610F couples with landing container 620. In some embodiments, the walls of landing container 620 may support helicopter 100 in an upright orientation.

FIG. 6G illustrates one embodiment of a folding legs landing module 610G. Folding legs landing module 610G may include at least two landing legs 625 which stabilize helicopter 100 in an upright position. In some embodiments, landing legs 625 are fixed in a stabilization position. In other embodiments, landing legs 625 are configured to pivot from a position that is parallel to fuselage 180 to the stabilization position. This disclosure contemplates that pivoting of landing legs 625 may be weight-driven, servo driven, spring-driven, and the like. In some embodiments, controller 182 is communicably coupled to folding legs landing module 610G and is configured to control the position of landing legs 625. For example, a helicopter 100 that includes folding legs landing module 610F may be ejected from a drop aircraft with folding legs 625 positioned parallel to fuselage 180. At the appropriate time, folding legs 625 of helicopter 100 move into a stabilization position upon instruction from controller 182. Upon landing on the surface, landing legs 625 support helicopter 100 in a generally vertical orientation.

FIG. 6H illustrates one embodiment of a vacuum landing module 610H. In some embodiments, vacuum landing module 610H may comprise a deformable material having a concave shape and be configured to couple to a surface using a vacuum. In some embodiments, vacuum landing module 610H includes a suction cup. In some embodiments, vacuum landing module 610H comprises a motor or pump for creating a vacuum. Vacuum landing module 610H may be coupled to power source 184. In some embodiments, vacuum landing module 610H is communicably coupled to controller 182 and controller 182 is configured to provide instructions to vacuum landing module 610H. For example, controller 182 may disable vacuum landing module 610H during flight to conserve power. Upon detection and determination that helicopter 100 is nearing a suitable landing surface, controller 182 may power on vacuum landing module, thereby causing vacuum landing module 610H to create suction. This suction may then allow helicopter 100 to couple to the landing surface. In some embodiments, vacuum landing module 610H couples to landing surfaces that are horizontal (e.g., the ground). However, in other embodiments, vacuum landing module 610H couples to landing surfaces that are non-horizontal or vertical (e.g., a wall) resulting in helicopter 100 being held in a horizontal orientation. Such horizontal landing may be accomplished by weight-shifting fuselage 180 to bring vacuum landing module 610H into contact with the non-horizontal or vertical surface.

FIG. 6I illustrates one embodiment of a self-balancing wheel landing module 610I. Self-balancing wheel landing module 610I may comprise one or more wheels 630. In some embodiments, wheel 630 is not powered. In other embodiments, wheel 630 is powered by a motor coupled to power source 184. In some other embodiments, controller 182 is communicably coupled to, and configured to provide instructions to, self-balancing wheel landing module 610I. In such embodiments, controller 182 may control various characteristics of wheels 630, including but not limited to the direction and speed of turning wheels 630 and the braking of wheels 630. As such, helicopter 100 may continue to travel along the landing surface after it has landed. In some embodiments, wheel 630 may be coupled to a full power torque motor or a brushless torque gimbal motor.

Figure 7:
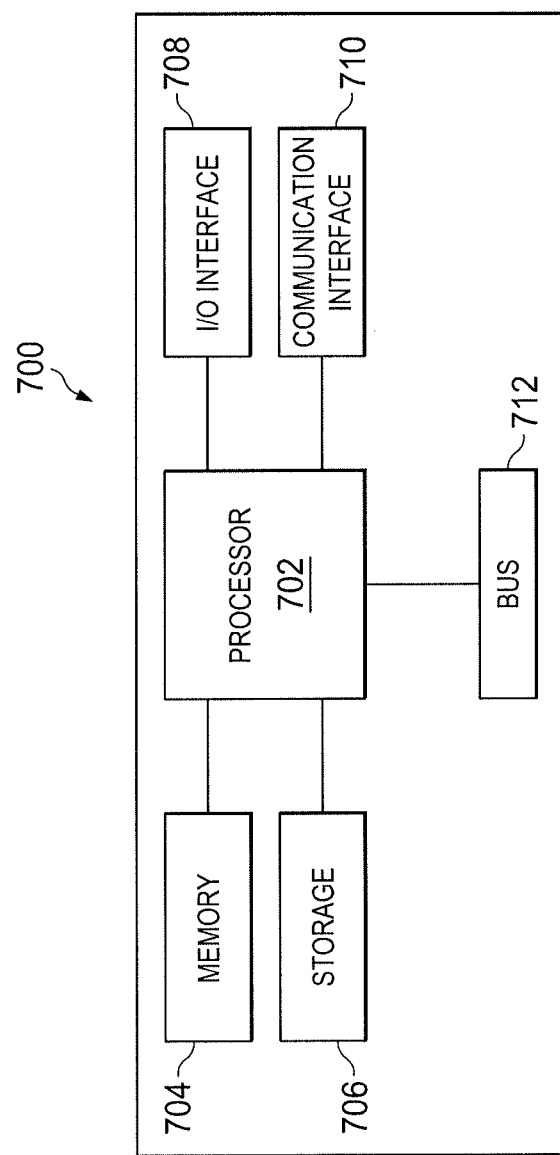
FIG. 7 illustrates an example computer system that may be included in a controller of the weight-shifting coaxial helicopter of FIG. 1, according to certain embodiments.

FIG. 7 illustrates an example computer system 700. Computer system 700 may be utilized by helicopter 100 of FIG. 1. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SEC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

The components of computer system 700 may be integrated or separated. In some embodiments, components of computer system 700 may each be housed within a single chassis. The operations of computer system 700 may be performed by more, fewer, or other components. Additionally, operations of computer system 700 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 8:
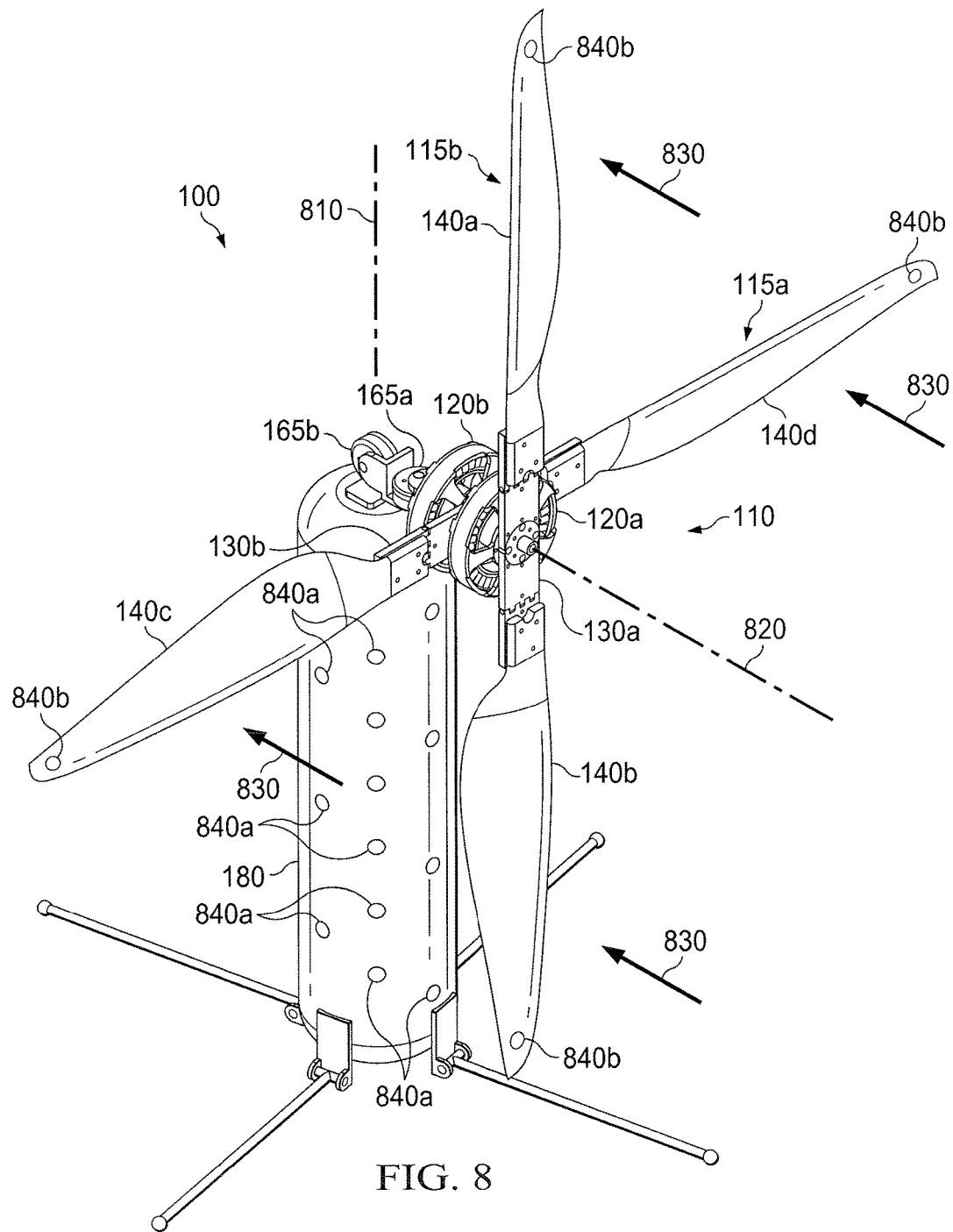
FIG. 8 illustrates a configuration of the weight-shifting coaxial helicopter of FIG. 1, according to certain embodiments.
Figure 9:
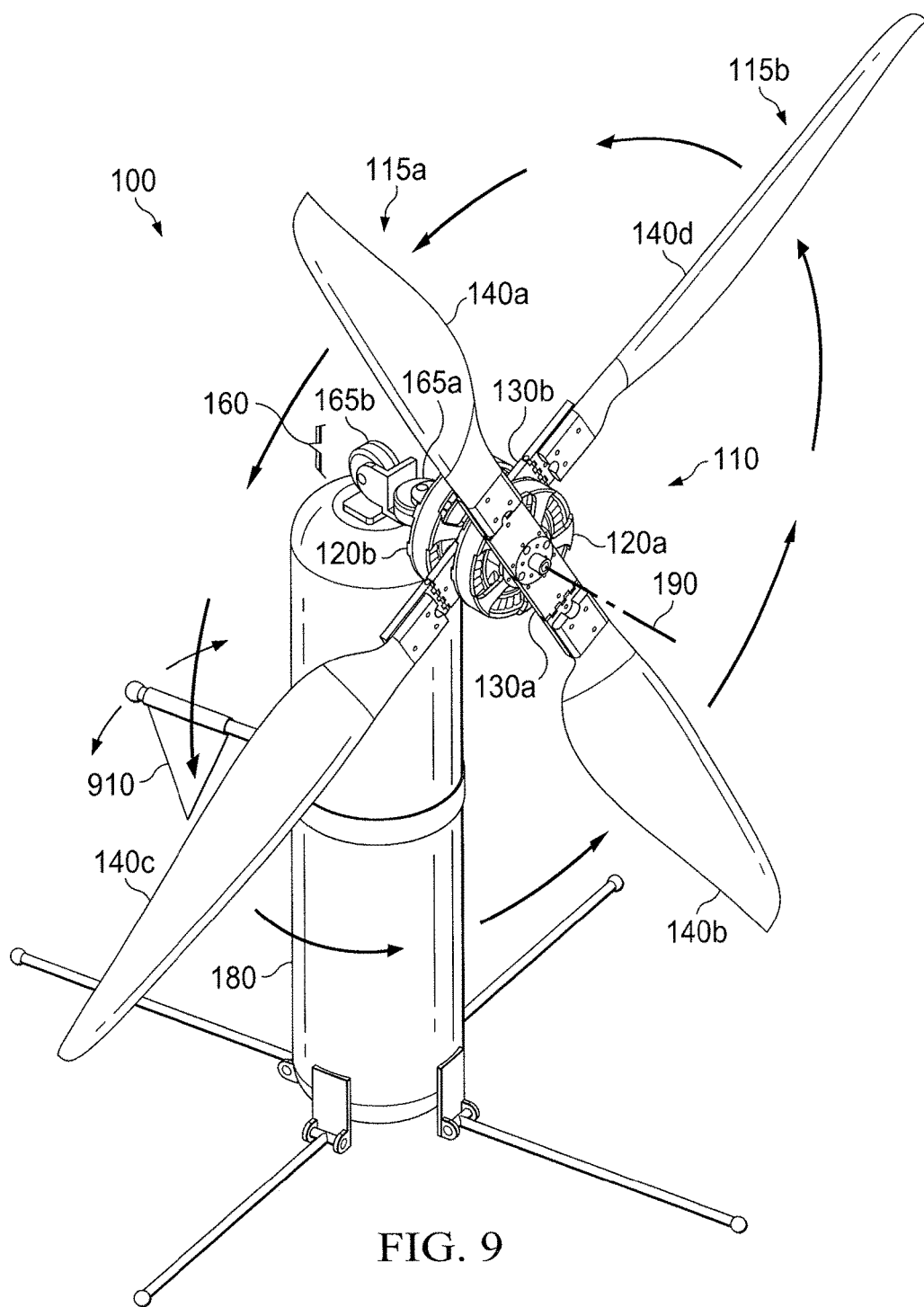
FIG. 9 illustrates a wind generation capability of the weight-shifting coaxial helicopter of FIG. 1, according to certain embodiments.

As mentioned above, helicopter 100 may be configured to recharge power source 184 in some embodiments. FIGS. 8 and 9 illustrate various aspects of an embodiment of helicopter 100 configured to recharge power source 184 by harnessing wind energy. Specifically, FIG. 8 depicts helicopter 100 detecting wind information and FIG. 9 depicts helicopter 100 recharging power source 184 with wind power.

Generally, helicopter 100 may be in flight for any particular period of time before controller 182 provides instructions to rotors 130 and/or gimbal motors 165 to land helicopter 100. In some embodiments, controller 182 determines that helicopter 100 should land in response to receiving a command from a remote source. In other embodiments, controller 182 determines that helicopter 100 should land based on a determination about power source 184. For example, controller 182 may determine to land helicopter 100 because power source 184 is running low on power. Determining whether power source 184 is running low may be based on a threshold (e.g., power remaining is 15.%).

Helicopter 100 may be equipped with componentry configured to detect a suitable landing spot in some embodiments. For example, in response to determining whether to land helicopter 100, controller 182 may receive information about potential landing spots from various sources including, without limitation, one or more of cameras, maps (e.g., Google Earth), and operators. As used herein, a suitable landing spot may refer to a location where helicopter 100 may land and regenerate power. As an example, a suitable landing spot may be an open field with little to no foliage, plants, vegetation or developments that may block or impede helicopter 100 from receiving wind. As another example, a suitable landing spot may be a telephone wire that helicopter 100 may couple itself to (e.g., using grapple base landing module depicted in FIG. 6C). Upon detecting a suitable landing spot, helicopter 100 may proceed to land as described above.

FIG. 8 illustrates a configuration of helicopter 100. Helicopter 100 may orient itself in the configuration depicted in FIG. 8 when it is determining a direction and/or angle in which to orient blades 140 for wind regeneration. Helicopter 100 may recharge power source 184 in a manner similar to a wind turbine. More specifically, rotation of blades 140 by the wind results in the generation of electricity which may be stored in power source 184. This disclosure recognizes that wind regeneration may be improved by including particular componentry. For example, power source 184 may be a direct current (DC) battery in some embodiments. The DC battery may, in some embodiments, be configured to be charged by one or more brushed DC motors or one or more brushless alternating current (AC) motors. If motors 120 of helicopter 100 are brushless AC motors, the current may require rectification. In some embodiments, controller 182 may provide instructions to one or more components (e.g., a rectifier) of helicopter 100 to convert AC to DC such that the DC battery (e.g., power source 184) may be charged. This disclosure recognizes various benefits of motor 120 being a brushless AC motor. For example, brushless AC motors may recharge power source 184 more efficiently than brushed DC motors.

In order to achieve regeneration, propulsion system 110 of helicopter 100 may be rotated and/or pitched using one or more gimbal motors 165 such that the orientation of blades 140 permits the wind to rotate blades 140. As used herein, the words "position" and "orientation" may be used interchangeably and may refer to one or more of a direction, a location, and/or an angle. In some embodiments, determining when or how much to pitch or rotate propulsion system 110 is an instruction sent to gimbal motors 165 from controller 182.

As depicted in FIGS. 8 and 9, propulsion system 110 is pitched by gimbal motor 165b about 90° from its normal orientation (see FIG. 1). Although FIGS. 8 and 9 depict a 90° change in orientation, this disclosure recognizes that gimbal motors 165 may rotate propulsion system 110 any suitable number of degrees (or any other suitable measuring unit). In some embodiments, determining how far to pitch and/or rotate propulsion system 110 is based on information about the wind. For example, in response to determining that the wind is blowing at a particular angle, controller 182 may provide instructions to gimbal motor 165 to orient propulsion system 110 into a position such that blades 140 may be rotated by the wind. As depicted in FIG. 8, blades 140 are oriented in a position which permits wind (indicated by arrows 830) to rotate blades 140 (see FIG. 9).

In some embodiments, helicopter 100 is configured to receive wind information. As used herein, wind information may comprise any information about the wind, including without limitation information about the speed and/or direction of the wind. Wind information may be received continuously, periodically, or on-demand. In some embodiments, wind information may be received during flight of helicopter 100 and/or after helicopter 100 has landed.

Helicopter 100 may receive wind information from one or more onboard components in some embodiments. As one example, helicopter 100 may include one or more sensors 840 configured to detect wind information. In one embodiment, sensors 840 may be located on and/or around body 180 (e.g., sensors 840a of FIG. 8). In such an embodiment, sensors 840a may detect wind information about 360° and provide wind speed or wind direction information to controller 182. In turn, controller 182 may use this information to determine in which direction and/or angle to orient blades 140 and provide corresponding instructions to gimbal motor 165. In another embodiment, sensors 840 may be located on one or more blades 140 (e.g., sensors 840b). In such an embodiment, gimbal motor 165 may be configured to turn propulsion system 110 about 360° such that sensors 840b may detect wind information about 360°. In addition to information about the speed and direction of the wind, sensors 840b may be configured to detect information about the rotations per minute (RPM) of blades 140. Sensors 840b may provide the detected information to controller 182 and controller 182 may determine, based on the provided information, an optimal orientation along the 360° rotation. The optimal orientation may correspond to an orientation that maximizes the extraction of wind energy and/or an orientation that permits rotation of blades 140. In some embodiments, controller 182 may select, as the optimal orientation, the position at which the strongest wind was measured (e.g., highest speed winds). In some other embodiments, controller 182 may not select, as the optimal orientation, the position at which the strongest wind was measured (e.g., strength of wind will result in damage to helicopter 100). Controller 182 may then provide instructions to gimbal motor 165 to orient blades 140 in the optimal orientation.

As another example, helicopter 100 may detect wind information with a wind flag (e.g., wind flag 910 depicted in FIG. 9). For example, helicopter 100 may include wind flag 910 that is communicatively coupled to controller 182. Wind flag 910 may be configured to spin about 360° in order to collect wind information and provide the wind information to controller 182. For example, wind flag 910 may automatically weather vane into the direction of the wind and provide the direction information to controller 182. Controller 182 may use the provided wind information to provide instructions to gimbal motor 165 to orient blades 140 in the direction of the wind. Although this disclosure describes specific examples of onboard components configured to detect wind information, this disclosure recognizes that helicopter 100 may include any suitable component configured to detect wind information. Wind information may also be received from a remote source in some embodiments. For example, controller 182 may receive information from one or more of a broadcast (e.g., weather broadcast), the internet, and an operator. In such embodiments, controller 182 may utilize the received wind information to orient blades 140 after landing. Although specific examples of remote sources have been described, this disclosure recognizes that wind information may be received from any suitable remote source.

Particular examples have been described above wherein blades 140 are oriented in the direction of the wind (e.g., detecting that the wind is blowing to the north and orienting blades 140 to accept the north wind). However, this disclosure also recognizes benefits of not orienting blades 140 in the direction of the wind. For example, blades 140 may not be oriented in the direction of the wind when the strength of wind may cause helicopter 100 to topple over. As another example, blades 140 may not be oriented in the direction of the wind when controller 182 determines a different position is better suited to rotate blades 140.

As described above, blades 140 may couple to hub 210 via hinge mechanisms 215. One of ordinary skill in the art will understand that a strong wind may cause blades 140 to pivot about hinge mechanism 215. Accordingly, hinge mechanism 215 may be configured to lock, or fix, each blade 140 in a particular position. As an example, hinge mechanisms 215 may be configured to lock blades 140 in a position wherein blades 140 are fully extended (see FIG. 8) or wherein blades 140 are collapsed (see FIG. 3). This disclosure recognizes that locking blades 140 in the extended position during regeneration may provide various benefits including increased efficiency of generating electricity. As depicted in FIG. 9, blades 140 are locked in the extended position while power source 184 is recharging.

This disclosure recognizes that some landing modules 610 may be better suited than others for wind regeneration. For example, landing modules 610 with increased stability (e.g., magnetic base landing module 610B, grapple base landing module 610C, cup holder landing module 6F, folding legs landing module 610G, and vacuum landing module 610H) may be recommended over landing modules 610 that may topple when confronted with a strong gust of wind (e.g., self-balancing landing module 610A, spike base landing module 610D, float base landing module 610E, and self-balancing wheel landing module 610I). The stability of some landing modules 210 may be improved to increase stability. As a specific example, the stability of folding legs landing module 610G may be improved by increasing the length of one or more folding legs.

In operation, helicopter 100 may be in flight and determine that the amount of power in power source 184 is below a particular threshold. Helicopter 100 may then receive information about a landing spot from one or more resources or components. As one example, helicopter 100 may receive information about a plurality of potential landing spots from a user or operator of helicopter 100. As another example, helicopter 100 may fly over the potential landing spots and determine, using an onboard camera, which of the potential landing spots would be most suitable for wind regeneration. After selecting one of the potential landing spots, helicopter 100 may begin its descent to the selected spot.

In some embodiments, helicopter 100 receives wind information about the direction of the wind from a radio broadcast. For example, helicopter 100 may receive information that the wind is blowing from the southwest. When helicopter 100 reaches the selected landing spot, controller 182 may provide instructions to gimbal motor 165 to point propulsion system 110 in the southwest direction. Positioning propulsion system 110 in such direction may result in a first position which permits blades 140 to rotate with the wind. Sensors on blades 140 may provide information to controller regarding the RPM of blades 140. If controller 182 receives information that the RPM of blades 140 is less than a threshold (e.g., 6 RPM), controller may provide instructions to gimbal motor 165 to reorient blades 140 to a better position for wind regeneration. As an example, controller 182 may provide instructions to gimbal motor 165 to rotate propulsion system 110 into a second position (e.g., 15° in the clockwise direction from the first position) and controller 182 may receive information about the RPM of blades 140 at the second position. If controller determines that the RPM of blades 140 at the first position is greater than the RPM of blades 140 at the second position, controller 182 may provide instructions to gimbal motor 165 to rotate propulsion system 110 back to the first position.

In other embodiments, controller 182 may provide instructions to gimbal motor 165 in order to orient blades 140 into a plurality of positions and receive wind information about each position of the plurality of positions. For example, controller 182 may provide instructions to gimbal motor 165 to orient blades 140 in a first position, wherein the first position comprises a 15° rotation about axis 810 and a 15° decrease in pitch angle from axis 820. As another example, controller 182 may provide instructions to gimbal motor 165 to orient blades 140 in a second position, wherein the second position comprises a 15° rotation about axis 810 and a 30° decrease in pitch angle from axis 820. As yet another example, controller 182 may provide instructions to gimbal motor 165 to orient blades 140 in a third position, wherein the third position comprises a 30° rotation about axis 810 and a 5° increase in pitch from axis 820. Controller 182 may then determine an optimal orientation from the plurality of positions. Controller 182 may then provide instructions to gimbal motor 165 to orient blades 140 in the optimal orientation and begin generating electricity.

Helicopter 100 may generate electricity until power source 184 is completely charged in some embodiments. In other embodiments, helicopter 100 may generate electricity until power source 184 is charged a particular amount. As an example, controller 182 may estimate that helicopter 100 requires a certain amount of power to return to a home base. In such an example, helicopter 100 may stop generating electricity after power source 184 reaches the required amount of power. As another example, controller 182 may determine that a certain amount of power is required to power one or more onboard components or systems (e.g., a camera, a GPS, an autopilot system, a beacon, a satellite, etc.). In such an example, helicopter 100 may generate the required amount of electricity to power the one or more onboard components or systems.

The efficiency of power regeneration may be improved with custom software. Thus, in particular embodiments, regeneration is performed using software. Such software may be saved to storage (e.g., storage 706 of FIG. 7). The software may be configured to apply a regeneration force during recharge (e.g., a resistance on the motor), thereby increasing the efficiency of generating electricity. Thus, in some embodiments, the software receives information about the RPM of blades 140, calculates an optimal regeneration force based on the received information, and applies the optimal regeneration force during recharge. This disclosure recognizes that applying an optimal amount of regeneration force may be associated with various benefits including decreased recharge time.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An unmanned helicopter comprising:
   a propulsion system comprising:
      a first rotor assembly comprising a first motor coupled to a first rotor, the first rotor comprising a plurality of first fixed-pitch blades; and
      a second rotor assembly comprising a second motor coupled to a second rotor, the second rotor comprising a plurality of second fixed-pitch blades, wherein:
         the second rotor is coaxial to the first rotor; and
         the second motor is in stacked assembly with the first motor;
   a fuselage comprising:
      a power source; and
      a controller; and
   a gimbal assembly coupling the fuselage to the propulsion system, the gimbal assembly comprising:
      a first gimbal motor configured to control pitch of the unmanned helicopter; and
      a second gimbal motor being in stacked assembly with the first gimbal motor, the second gimbal motor being configured to control roll of the unmanned helicopter;
   wherein the controller is communicably coupled to the first and second gimbal motors and is configured to provide instructions to at least one of the first or second gimbal motors in order to orient the plurality of first fixed-pitch blades and second fixed-pitch blades into a position that permits wind to rotate the first fixed-pitch blades and second fixed-pitch blades and thereby charge the power source.

2. The unmanned helicopter of claim 1, wherein the controller is further configured to receive information about the wind.

3. The unmanned helicopter of claim 2, wherein the information about the wind comprises one or more of a direction of the wind and a speed of the wind.

4. The unmanned helicopter of claim 2, the controller further configured to provide instructions to at least one of the first or second gimbal motors in order to orient the plurality: of first and second fixed-pitch blades into an orientation that permits the plurality of first and second fixed-pitch blades to be rotated by the wind, wherein the controller determines the orientation by:
   orienting the first and second fixed-pitch blades into a first position;
   receiving first wind information about the first position;
   orienting the first and second fixed-pitch blades into a second position;
   receiving second wind information about the second position; and
   selecting, based on a comparison of the received first and second wind information, the first position as the orientation.

5. The unmanned helicopter of claim 1, further comprising one or more sensors configured to detect information about the wind.

6. The unmanned helicopter of claim 1, further comprising a wind flag configured to detect information about the wind.

7. The unmanned helicopter of claim 1, wherein the controller is further configured to determine whether a landing spot is suitable for wind to rotate the first fixed-pitch blades and second fixed-pitch blades and thereby charge the power source.

8. The unmanned helicopter of claim 1, wherein:
   each of the plurality of first and second fixed-pitch blades is coupled to a hub of its respective rotor via a hinge mechanism; and
   the hinge mechanism is configured to:
      allow each of the fixed-pitch blades to pivot from a position perpendicular to the fuselage into a position parallel to the fuselage; and
      lock each of the fixed-pitch blades in either the perpendicular position or the parallel position.

9. A helicopter comprising:
   a propulsion system comprising:
      a first rotor assembly comprising a first motor coupled to a first rotor, the first rotor comprising a plurality of first fixed-pitch blades; and
      a second rotor assembly comprising a second motor coupled to a second rotor, the second rotor comprising a plurality of second fixed-pitch blades, the second rotor being coaxial to the first rotor;
   a fuselage comprising:
      a power source; and
      a controller; and
   a gimbal assembly coupling the fuselage to the propulsion system, the gimbal assembly comprising a first gimbal motor and a second gimbal motor, the first and second gimbal motors being in stacked assembly and configured to weight-shift the helicopter;
   wherein the controller is communicably coupled to the first and second gimbal motors and is configured to provide instructions to at least one of the first or second gimbal motors in order to orient the plurality of first and second fixed-pitch blades into a position that permits wind to rotate the first and second fixed-pitch blades and thereby charge the power source.

10. The helicopter of claim 9, wherein the controller is further configured to receive information about the wind and the information about the wind comprises one or more of a direction of the wind and a speed of the wind.

11. The helicopter of claim 9, wherein:
   the controller is further configured to receive information about a landing spot from a source;
   the source is selected from the group consisting of:
      a camera;
      a map; and
      an operator associated with the helicopter.

12. The helicopter of claim 9, further comprising one or more sensors configured to detect information about the wind.

13. The helicopter of claim 9, further comprising a wind flag configured to detect information about the wind.

14. The helicopter of claim 9, wherein the controller is further configured to determine whether a landing spot is suitable for wind to rotate the first and second fixed-pitch blades and thereby charge the power source.

15. The helicopter of claim 9, wherein:
   each of the plurality of first and second fixed-pitch blades is coupled to a hub of its respective rotor via a hinge mechanism; and
   the hinge mechanism is configured to:
      allow each of the first and second fixed-pitch blades to pivot from a position perpendicular to the fuselage into a position parallel to the fuselage; and
      lock each of the first and second fixed-pitch blades in either the perpendicular position or the parallel position.

16. The helicopter of claim 10, the controller further configured to provide instructions to at least one of the first or second gimbal motors in order to orient the plurality of first and second fixed-pitch blades into an orientation that permits the plurality of first and second fixed-pitch blades to be rotated by the wind, wherein the controller determines the orientation by:

orienting the first and second fixed-pitch blades into a first position;

receiving first wind information about the first position;

orienting the first and second fixed-pitch blades into a second position;

receiving second wind information about the second position; and selecting, based on a comparison of the received first and second wind information, the first position as the orientation.

17. A controller that is communicably coupled to a first gimbal motor and second gimbal motor of a helicopter, the controller configured to:

provide instructions to at least one of the first gimbal motor or the second gimbal motor in order to orient a plurality of first fixed-pitch blades and second fixed-pitch blades into a position that permits wind to rotate the first and second fixed-pitch blades and thereby charge a power source; and wherein:
the first gimbal motor is positioned along a first axis;
the second gimbal motor is positioned along a second axis in stacked assembly with the first gimbal motor; and
the second axis is perpendicular to the first axis.

18. The controller of claim 17, wherein the controller is further configured to receive information about the wind.

19. The controller of claim 17, wherein the controller is further configured to determine whether a landing spot is suitable for wind to rotate the first and second fixed-pitch blades and thereby charge the power source.

20. The controller of claim 17, wherein the controller is further configured to provide instructions to at least one of the first or second gimbal motors in order to orient the plurality of first and second fixed-pitch blades into an orientation that permits the plurality of first and second fixed-pitch blades to be rotated by the wind, wherein the controller determines the orientation by:

orienting the first and second fixed-pitch blades into a first position;

receiving first wind information about the first position;

orienting the first and second fixed-pitch blades into a second position;

receiving second wind information about the second position; and selecting, based on a comparison of the received first and second wind information, the first position as the orientation.

* * * * *